US012787997B1

(12) United States Patent
Hager

(10) Patent No.: US 12,787,997 B1
(45) Date of Patent: Nov. 10, 2026

(54) TACKLE BOX

(71) Applicants: Gregory B. Rigsby, McMinnville, TN (US); Jason Ralph Hager, Spurlock, WV (US)

(72) Inventor: Jason Ralph Hager, Spurlock, WV (US)

( * ) Notice: Subject to any disclaimer, the term of this patent is extended or adjusted under 35 U.S.C. 154(b) by 0 days.

(21) Appl. No.: 18/405,324

(22) Filed: Jan. 5, 2024

Related U.S. Application Data

(60) Provisional application No. 63/437,286, filed on Jan. 5, 2023.

(51) Int. Cl.
*A01K 97/06* (2006.01)
*F21S 9/03* (2006.01)
*F21V 23/06* (2006.01)
*F21V 33/00* (2006.01)
*F21Y 115/10* (2016.01)

(52) U.S. Cl.
CPC .............. *A01K 97/06* (2013.01); *F21S 9/037* (2013.01); *F21V 23/06* (2013.01); *F21V 33/008* (2013.01); *F21Y 2115/10* (2016.08)

(58) Field of Classification Search
CPC ...................................................... A01K 97/06
See application file for complete search history.

(56) References Cited

U.S. PATENT DOCUMENTS 2,751,489 A 6/1956 Cole
3,800,361 A * 4/1974 Stauffer ................ A45F 5/1046 294/171
3,938,132 A * 2/1976 Cunningham ......... A01K 97/06 43/17.5
6,870,089 B1 3/2005 Gray
8,052,020 B1 * 11/2011 Wurtz .................... A01K 97/22 224/676
8,707,612 B2 * 4/2014 Konz ..................... A01K 97/04 43/17.5
10,116,139 B2 * 10/2018 Williams .................. F21S 9/03
10,271,626 B1 4/2019 Anderson
11,596,143 B2 * 3/2023 Spencer ............... A45C 13/008
2006/0028820 A1 2/2006 Fitzsimmons (Continued)

FOREIGN PATENT DOCUMENTS

CN 115553269 A * 1/2023
DE 202007017449 U1 * 4/2008 ............ A01K 85/01

(Continued)

*Primary Examiner* — Magdalena Topolski
(74) *Attorney, Agent, or Firm* — Boudwin Intellectual Property Law, LLC; Daniel Boudwin

(57) ABSTRACT

An illuminated tackle box includes a container housing having a base, a perimeter sidewall, and a hingedly affixed lid defining an interior volume. A plurality of lights are disposed within the interior volume and are configured to illuminate the interior volume in low-light conditions. A power source is disposed within the container housing and is operably connected to the plurality of lights. A solar panel is affixed to an exterior surface of the lid, wherein the solar panel is operably connected to the power source. A charging port, such as a USB port, is operably connected to the power source and disposed on an exterior surface of the container housing. In this way, the user can visualize the interior volume in low-light conditions, as well as a mobile device, such as a smartphone while fishing.

14 Claims, 3 Drawing Sheets

(56) References Cited

U.S. PATENT DOCUMENTS

| | | | |
|---|---|---|---|
| 2014/0341413 A1 | 11/2014 | McKeough | |
| 2015/0270728 A1 | 9/2015 | Williams | |
| 2015/0377549 A1* | 12/2015 | Cai | A01K 97/06<br>43/17.5 |
| 2016/0190817 A1 | 6/2016 | Hartelt | |
| 2017/0104335 A1 | 4/2017 | Williams | |

FOREIGN PATENT DOCUMENTS

| | | | |
|---|---|---|---|
| DE | 102019200064 A1 * | 7/2020 | B65D 1/00 |
| KR | 101928492 * | 3/2019 | |

* cited by examiner

TACKLE BOX

CROSS-REFERENCE TO RELATED APPLICATIONS

This U.S. Non-Provisional Patent application claims the benefit of U.S. Provisional Patent Application No. 63/437,286, filed on Jan. 5, 2023. The above identified patent application is herein incorporated by reference in its entirety to provide continuity of disclosure.

BACKGROUND OF THE INVENTION

The present invention relates to a tackle box. More particularly, the present invention relates to an illuminated tackle box.

Many individuals enjoy fishing, including fishing at night, however night fishing requires several additional pieces of equipment. For example, head lamps, flashlights, or other lighting tools are required to increase visibility when fishing at night. However, additional tools often require multiple trips between the fishing location and the user's vehicle, or otherwise take-up limited space in a fishing boat. Additionally, power supplies for maintaining a charge in a mobile device are helpful in the case of an emergency, however power supplies similarly take-up additional space or present an obstacle in transportation. Consolidating each required tool into a singular device would therefore save space and reduce transportation frustration.

Therefore, in order to address these concerns, the present invention will provide the users with an illuminated tackle box having an independent power source capable of simultaneously charging a mobile device and powering a series of lights capable of illuminating the surrounding area and the interior of the tackle box.

SUMMARY OF THE INVENTION

In view of the foregoing disadvantages inherent in the known types of illuminated tackle boxes now present in the prior art, the present invention provides an illuminated tackle box wherein the same may be utilized for providing added convenience for a user when using an illuminated tackle box.

The present invention relates to a tackle box. More particularly, the present invention relates to an illuminated tackle box.

The illuminated tackle box includes a container housing having a base, a perimeter sidewall, and a hingedly affixed lid defining an interior volume, a plurality of lights disposed within the interior volume, a power source disposed within the container housing, the power source is operably connected to the plurality of lights, and at least one charging port and a solar panel operably connected to the power source on an exterior surface of the container housing, wherein the plurality of lights are configured to illuminate the interior volume.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. The figures are intended for representative purposes only and should not be considered to be limiting in any respect.

Figure 1:
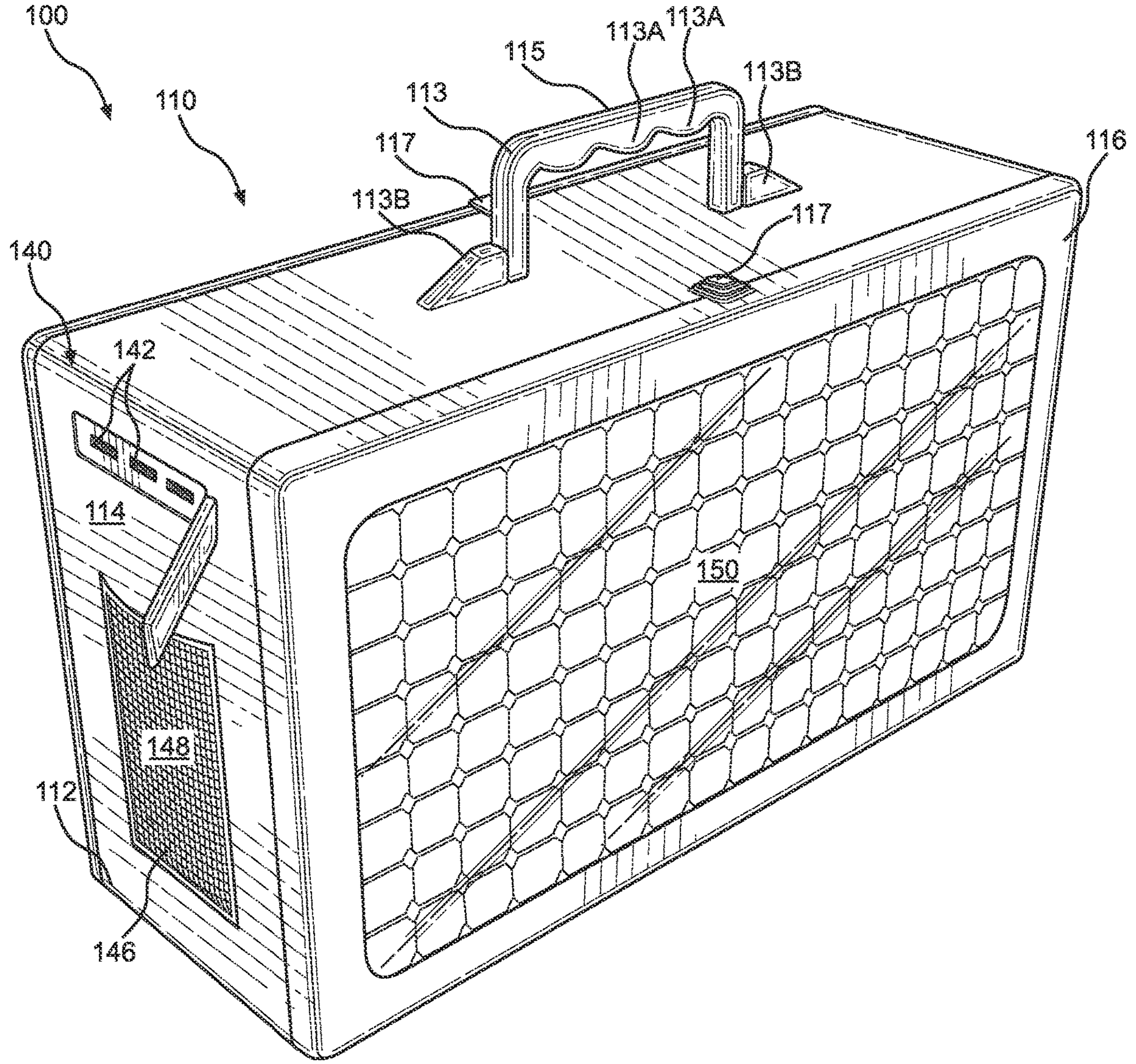
FIG. 1 shows a front perspective view of an embodiment of the illuminated tackle box in a closed position.
Figure 2:
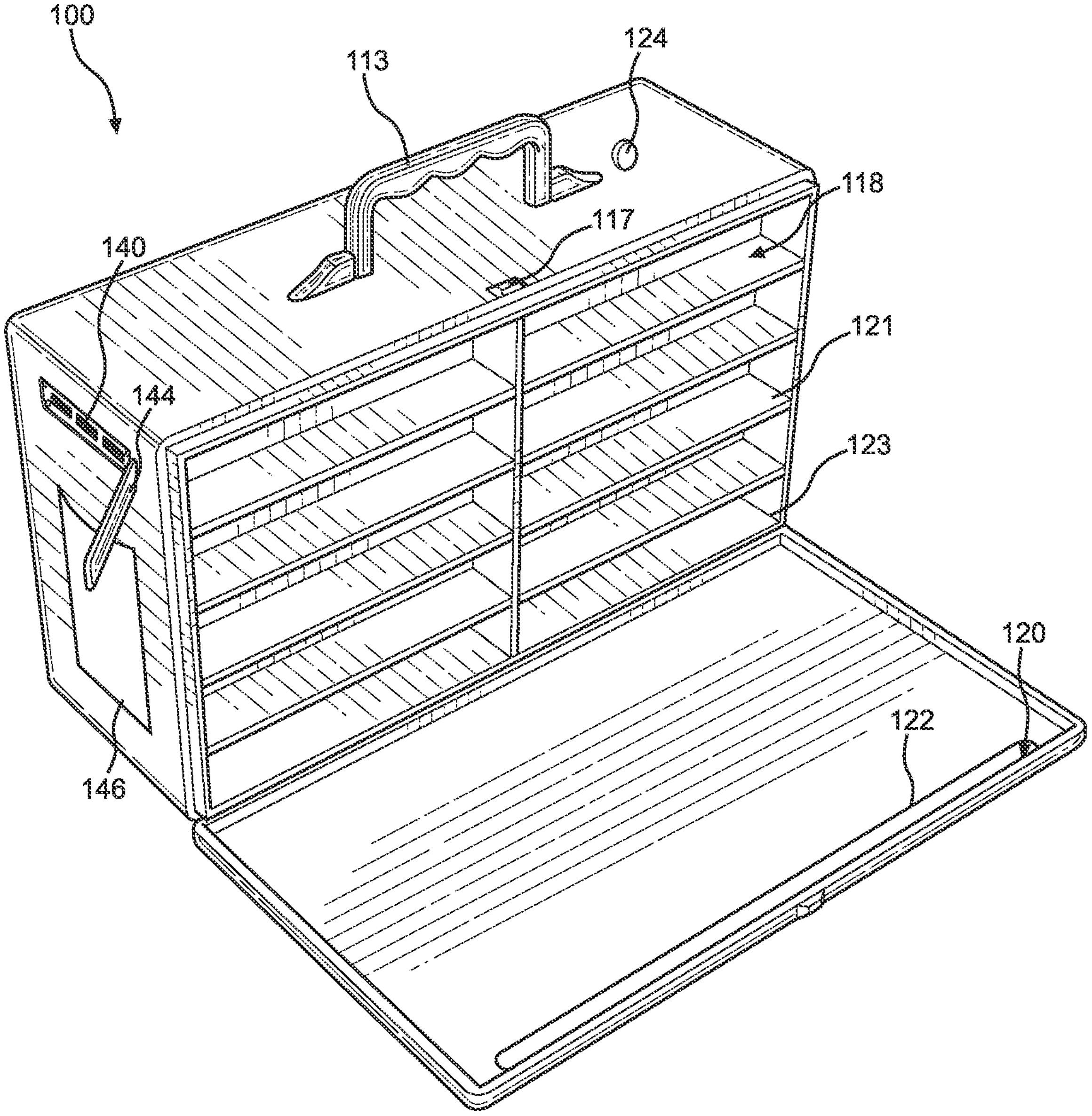
FIG. 2 shows a front perspective view of an embodiment of the illuminated tackle box in an open position.

Referring now to FIG. 1 and FIG. 2, there is shown a front perspective view of an embodiment of the illuminated tackle box 100 in a closed position and in an open position.

The illuminated tackle box 100 may include a container housing 110, a plurality of lights 120, a power source 130, at least one charging port 140, and a solar panel 150.

The container housing 110 may have a base 112, a perimeter sidewall 114, and a hingedly affixed lid 116 defining an interior volume 118. A handle 113 may be disposed on a centered top portion of the container housing 110, wherein the handle 113 may be dimensioned to provide a gripping surface 115 for the user. In the shown embodiment, the handle 113 may comprise a plurality of finger grooves 113A therein to facilitate grasping the handle 130. The handle 113 may also be supported by a pair of raised protrusions 113B at each end of the handle 113 going into the centered top portion of the container housing 110. A pair of latches 117 may be disposed on top of a front edge and a back edge of the container housing 110 and the affixed lid 116, wherein the pair of latches 117 are configured to retain the affixed lid 116 in a closed position, as shown in the illustrated embodiment in FIG. 1. The affixed lid 116 may be opened from the front or the back of the container housing 110.

The plurality of lights 120 may be disposed within the interior volume 118 and illuminate the interior volume 118 in low-light conditions. In the illustrated embodiment shown in FIG. 2, the plurality of lights 120 may comprise an LED strip 122 disposed along an upper edge of an interior surface of the affixed lid 116. The interior volume 118 may further comprise a plurality of shelves 121 therein defining a plurality of compartments 123 therein. In some embodiments, a light sensor 124 may be disposed on the housing 110, wherein the light sensor 124 may be configured to actuate the plurality of lights 120 when a level of light in the surrounding area falls below a predetermined threshold.

The power source 130 may be operably connected to the plurality of lights 120, wherein the plurality of lights 120 are oriented towards the interior volume 118 when the affixed lid 116 is in the open position. The power source 130 may be disposed within the container housing 110. A solar panel 150 may be affixed to an exterior surface of the affixed lid 116, wherein the solar panel 150 may be operably connected to the power source 130 such as an internal back-up battery 130A or the like. In this manner, the solar panel 150 may be configured to recharge the power source 130.

The at least one charging port 140 may be disposed on a side panel of the perimeter sidewall 114, wherein the at least one charging port 140 may comprise at least one Universal Serial Bus or USB port 142 configured to operably connect a mobile device (not shown) to the power source 130.

Figure 3:
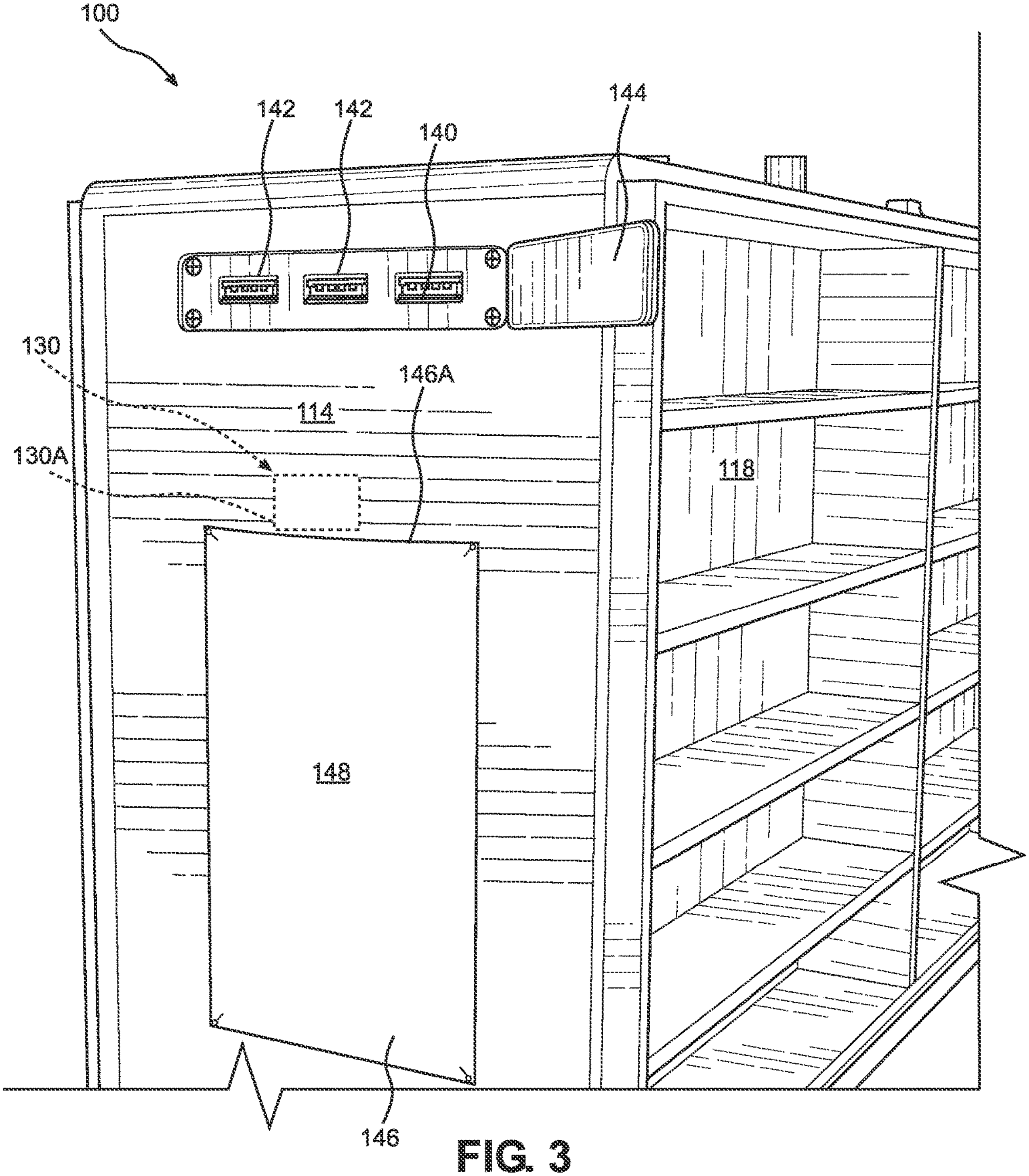
FIG. 3 shows a side perspective view of the side panel of the perimeter sidewall of an embodiment of the illuminated tackle box.

Referring now to FIG. 3, there is shown a perspective view of the side panel of the perimeter sidewall 114 of an embodiment of the illuminated tackle box 100.

In the illustrated embodiment, the at least one charging port 140 may comprise a series of USB ports 142 that may be disposed adjacent to each other, wherein each of the USB 142 ports may be selectively covered by a cover panel 144 hingedly affixed to the side panel of the perimeter sidewall 114. The cover panel 144 may be configured to overlie the charging ports 142 when in a closed position, wherein the cover panel 144 may rest substantially flush with an exterior surface of the perimeter sidewall 114. A pocket 146 may be disposed on the exterior surface of the perimeter sidewall 114 below the at least one charging port 140 for convenience. In the shown embodiment, the pocket 146 may comprise a mesh material 148 affixed on three sides to the perimeter sidewall 114, wherein an upper end of the pocket 146 may comprise a pocket opening 146A. In this way, the user may visualize the interior volume 118 in low-light conditions, as well as a mobile device, such as a Smartphone while fishing.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An illuminated tackle box, comprising:

a container housing having a back wall, a perimeter side wall, and a front wall opposite the back wall defining an interior volume;

a plurality of lights disposed within the interior volume;

a power source disposed within the container housing, the power source is operably connected to the plurality of lights; and at least one charging port and a solar panel operably connected to the power source, the at least one charging port and the solar panel are disposed on an exterior surface of the container housing;

further comprising a light sensor disposed on the container housing to acuate the plurality of lights when a level of light falls below a predetermined threshold;

further comprising a pair of latches disposed on top of an edge of the container housing and the affixed lid to retain the affixed lid in a closed position;

further comprising a handle disposed on a perimeter sidewall at a centered top portion of the container housing to provide a gripping surface;

wherein the at least one charging port is disposed on a side panel of the perimeter sidewall;

wherein the at least one charging port includes at least one USB port;

wherein the power source is an internal back-up battery; and wherein the internal back-up battery may operate independently of the solar panel.

2. The illuminated tackle box, according to claim 1, wherein the handle includes a plurality of finger grooves therein to facilitate grasping the handle.

3. The illuminated tackle box, according to claim 2, wherein the handle is supported by a pair of raised protrusions at each end of the handle going into the centered top portion of the container housing.

4. The illuminated tackle box, according to claim 1, wherein the interior volume includes a plurality of shelves therein defining a plurality of compartments therein.

5. The illuminated tackle box, according to claim 1, wherein the plurality of lights illuminate the interior volume.

6. The illuminated tackle box, according to claim 5, wherein the plurality of lights includes an LED strip disposed along an upper edge of an interior surface of the affixed lid.

7. The illuminated tackle box, according to claim 6, wherein the plurality of lights are oriented towards the interior volume when the affixed lid is in the open position.

8. The illuminated tackle box, according to claim 1, wherein each of the at least one USB port is selectively covered by a cover panel hingedly affixed to the side panel of the perimeter sidewall.

9. The illuminated tackle box, according to claim 1, further comprising a pocket disposed on the exterior surface of the perimeter sidewall below the at least one charging port for convenience.

10. The illuminated tackle box, according to claim 9, wherein the pocket includes a mesh material affixed on three sides to the perimeter sidewall.

11. The illuminated tackle box, according to claim 9, wherein an upper end of the pocket includes a pocket opening.

12. The illuminated tackle box, according to claim 1, wherein the solar panel is affixed to an exterior surface of the affixed lid.

13. The illuminated tackle box, according to claim 1, wherein the solar panel is operably connected to recharge the power source.

14. An illuminated tackle box, consisting of:

a container housing having a base, a perimeter sidewall, and a hingedly affixed lid defining an interior volume;

a plurality of lights disposed within the interior volume;

a power source disposed within the container housing, the power source is operably connected to the plurality of lights; and at least one charging port and a solar panel operably connected to the power source, the at least one charging port and the solar panel are disposed on an exterior surface of the container housing;

further comprising a light sensor disposed on the container housing to acuate the plurality of lights when a level of light falls below a predetermined threshold;

further comprising a pair of latches disposed on top of an edge of the container housing and the affixed lid to retain the affixed lid in a closed position;

further comprising a handle disposed on a centered top portion of the container housing to provide a gripping surface;

wherein the at least one charging port is disposed on a side panel of the perimeter sidewall;

wherein the at least one charging port includes at least one USB port; and wherein the power source is an internal back-up battery;

wherein the internal back-up battery may operate independently of the solar panel;

wherein the handle includes a plurality of finger grooves therein to facilitate grasping the handle;

wherein the handle is supported by a pair of raised protrusions at each end of the handle going into the centered top portion of the container housing;

wherein the interior volume includes a plurality of shelves therein defining a plurality of compartments therein;

wherein the plurality of lights illuminate the interior volume;

wherein the plurality of lights includes an LED strip disposed along an upper edge of an interior surface of the affixed lid;

wherein the plurality of lights are oriented towards the interior volume when the affixed lid is in the open position;

wherein each of the at least one USB port is selectively covered by a cover panel hingedly affixed to the side panel of the perimeter sidewall;

further comprising a pocket disposed on the exterior surface of the perimeter sidewall below the at least one charging port for convenience;

wherein the pocket includes a mesh material affixed on three sides to the perimeter sidewall;

wherein an upper end of the pocket includes a pocket opening;

wherein the solar panel is affixed to an exterior surface of the affixed lid; and wherein the solar panel is operably connected to recharge the power source.

* * * * *